United States Patent [19]
Creagh et al.

[11] 3,716,289
[45] Feb. 13, 1973

[54] ELECTRO-OPTICAL DISPLAY DEVICES USING SMECTIC-NEMATIC LIQUID CRYSTAL MIXTURES

[75] Inventors: Linda T. Creagh, Argyle; Derick Jones; Sun Lu, both of Dallas, all of Tex.

[73] Assignee: Texas Instruments Incorporated, Dallas, Tex.

[22] Filed: Aug. 31, 1970

[21] Appl. No.: 68,280

[52] U.S. Cl..............................350/160 LC, 252/408
[51] Int. Cl...............................G02f 1/34, C09k 3/00
[58] Field of Search ...350/160; 252/408; 23/230 LC; 356/160

[56] References Cited

UNITED STATES PATENTS

| | | |
|---|---|---|
| 3,622,224 | 11/1971 | Wysocki et al. .................350/160 R |
| 3,441,513 | 4/1969 | Woodmansee.......................350/160 |
| 3,410,999 | 11/1968 | Fergason et al. ....................350/160 |
| 3,499,112 | 3/1970 | Heilmeier et al. ...................350/160 |

*Primary Examiner*—William L. Sikes
*Assistant Examiner*—V. P. McGraw
*Attorney*—Samuel M. Mims, Jr., James O. Dixon, Andrew M. Hassell, John E. Vandigriff, Melvin Sharp, Henry T. Olsen, Michael A. Sileo, Jr. and Gary C. Honeycutt

[57] ABSTRACT

A display device includes a layer of a smectic-nematic liquid crystal composition that is normally transparent to light. The composition is effective to scatter light in response to a voltage applied thereacross. The smetic-nematic compositions exhibit the mesomorphic state through a broad temperature range that preferably includes room temperature.

12 Claims, 3 Drawing Figures

PATENTED FEB 13 1973
3,716,289
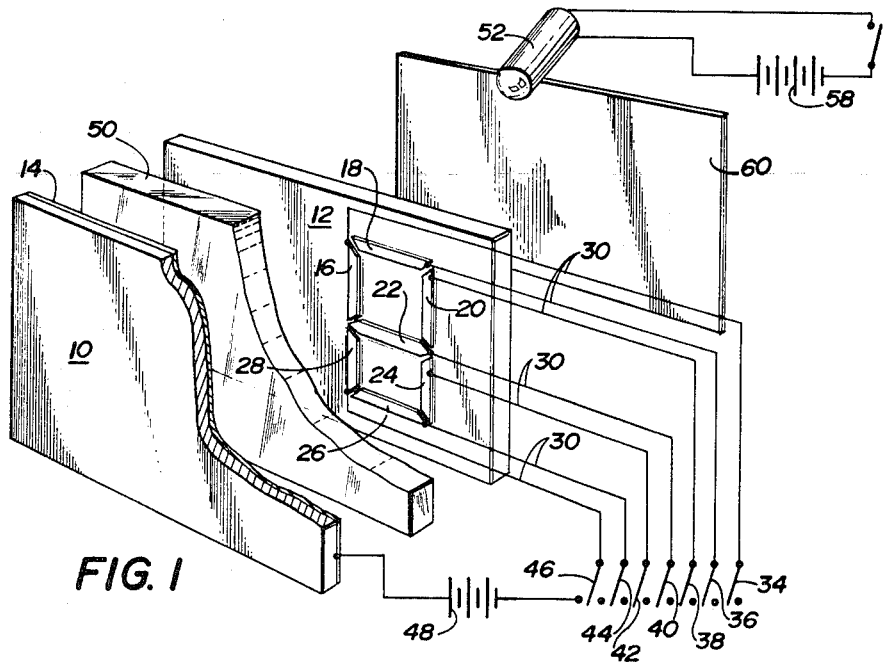
FIG. 1
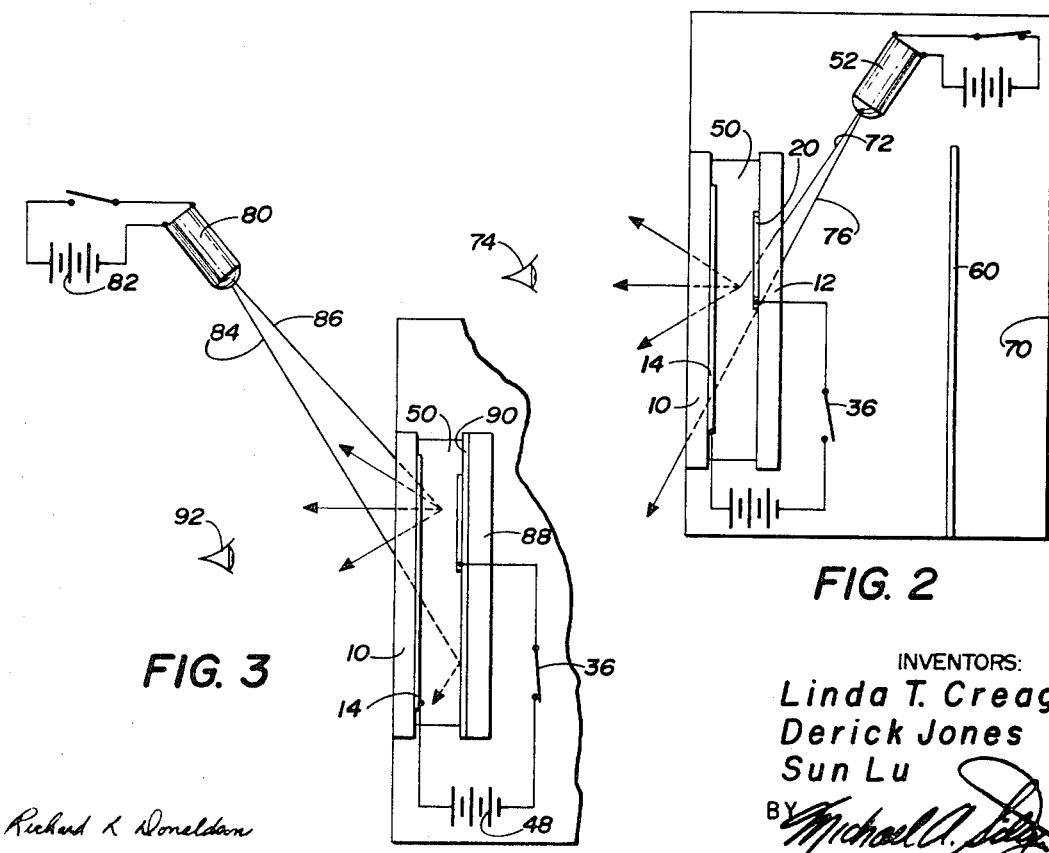
FIG. 2
FIG. 3
INVENTORS:
Linda T. Creagh
Derick Jones
Sun Lu
BY Michael A. Litz
ATTORNEY
Richard L. Donaldson
WITNESS ns. 3,716,289

ELECTRO-OPTICAL DISPLAY DEVICES USING SMECTIC-NEMATIC LIQUID CRYSTAL MIXTURES

This invention relates to display devices and more particularly to electro-optical display devices utilizing a thin layer of nematic-smectic mesomorphic composition.

The three common states of matter are the solid, liquid, and the gas in which the randomness of geometrical arrangement of the molecules increases from the solid to the liquid to the gas. The gas and the ordinary liquid are both isotropic, having the same physical properties in all directions. The solid may be amorphous, in which case the geometrical arrangement of the molecules is random, but the molecules are sufficiently bound so they are unable to move with respect to each other. Most inorganic and organic solids are found to be crystalline; that is, their molecular units are arranged in a regular repeating geometrical pattern known as a lattice unit. Many crystalline solids are anisotropic in that their physical properties vary, depending upon the direction of measurement with respect to different crystal axes. For most pure substances, the transition temperature between the solid state and the liquid state is quite sharp.

Certain organic solid compounds however, exhibit a peculiar behavior such that when heated they melt at a specific temperature, producing an opaque melt that changes abruptly to a clear isotropic liquid at a higher threshold temperature. In the temperature range between the solid and the isotropic liquid, these compounds are anistropic with respect to transmission of light. The characteristics of these compounds are thus, partly those of the crystalline solid, since they are anistropic, and partly those of the isotropic liquid since they exhibit liquid flow. These materials are therefore often called "liquid crystals" or more accurately, "crystalline liquids." These materials are sometimes classified as a fourth state of matter referred to as the mesomorphic state. That is, a state or phase intermediate that of the anistropic crystal and that of the isotropic liquid.

These are essentially two major classes of liquid crystals, the "nematic" state and the "smectic" state. The smectic state is characterized as the most highly ordered state of liquid crystals. Materials of this type, however, do not exhibit many of the useful optical properties characteristic of the nematic state. Specifically, they do not exhibit "dynamic scattering" in response to an electric field. On the other hand, smectic materials are desirable in that they exhibit a very low crystal-to-mesomorphic transition temperature and often exist in the mesomorphic state at room temperatures.

With respect to nematic liquid crystals, these materials frequently assume the characteristics of a thread-like texture when a thin section of the material is viewed between crossed polaroids. Nematic liquid crystals are normally transparent to light. When an electric potential, however, is impressed across the nematic liquid crystal it causes the crystal to scatter light. This effect has been termed "dynamic scattering" and is discussed in more detail in, George H. Heilmeier et al., "Dynamic Scattering: A New Electro-Optic Effect in Certain Classes of Nematic Crystals," *Proceedings of the I.E.E.E.*, Vol. VI, No. 7, July, 1968.

The dynamic scattering effect of nematic liquid crystals in response to a voltage applied across the crystal is useful in many electro-optic devices such as alpha-numeric displays, spatial displays, light valves and etc. Such devices are disclosed in more detail in U.S. Pat. No. 3,322,485 issued to R. Williams, May 30, 1967.

Conventional nematic liquid crystal materials exhibit the nematic mesophase generally at relatively high temperatures, and thus require external environmental control apparatus to maintain the material in a nematic mesophase. Further, the temperature range of the mesophase is generally very narrow, requiring that the temperature be accurately maintained. Various techniques have been proposed for lowering the temperature range of the nematic mesophase such as, for example, the method described in patent application Ser. No. 16,078 entitled "Electro-Optical Devices Using Lyotropic Nematic Liquid Crystals," assigned to the assignee of the present invention. In this application, lyotropic nematic liquid crystals which have a relatively low crystal-to-mesomorphic transition temperature are used in lieu of conventional thermotropic nematic liquid crystals.

Accordingly, it is an object of the present invention to provide a display device utilizing a liquid crystalline composition having a broad temperature range.

It is a further object of the present invention to provide an electro-optical display device that includes a nematic-smectic mixture which exhibits satisfactory switching characteristics and contrast ratios.

Briefly in accordance with the present invention, an electro-optical display device includes a first optically transmissive substrate and a first optically transmissive and electrically conductive coating on a face of the first substrate. A second substrate with an electrically conductive coating on a surface thereof is positioned such that the coatings and electrically conductive coating on a face of the first substrate. A second substrate with an electrically conductive coating on a surface thereof is positioned such that the coatings of the two substrates are adjacent and substantially equidistantly spaced apart. A light source means is positioned to direct light toward the substrates, and means are provided for impressing a voltage between the coatings. A nematic-smectic liquid crystal composition is placed in the space between the coatings, the composition having a threshold electrical field which when exceeded will cause the composition to scatter light. The composition has a broad temperature range in which it exhibits the mesomorphic state, the temperature range preferably encompassing room temperature.

The novel features believed to be characteristic of this invention are set forth in the appended claims; the invention itself however, as well as other objects and advantages thereof may best be understood by reference to the following detailed description of illustrative embodiments when read in conjunction with the accompanying drawing in which:

FIG. 1 is an exploded schematic view of a display device utilizing the composition of the present invention;

FIG. 2 is a side view of a device similar to that shown in FIG. 1, and

FIG. 3 is a side view of another embodiment of the display device of the present invention.

Referring to FIG. 1, two substrates or plates 10 and 12 are positioned substantially parallel to each other. Substrate 10, shown partially broken away, is optically transmissive and has deposited on a face thereof a coating 14 of a material which is optically transmissive and electrically conductive. Substrate 12 is also optically transmissive and has coated thereon a plurality of electrically insulated electrodes 16, 18, 20, 22, 24, 26 and 28. These electrodes are also optically transmissive and electrically conductive. Each of the electrodes 16 through 28 has attached thereto a lead 30 which is optically transmissive and which has been electrically insulated by an optically transmissive insulating composition. The leads 30 are connected to switches 34, 36, 38, 40, 42, 44 and 46 which correspond respectively to specific ones of electrodes 16, 18, 20, 22, 24, 26 and 28. Switches 34 – 46 are connected in parallel to a source 48 of electrical energy which is connected in series to electrically conductive coating 14.

Interposed between substrates 10 and 12 is a thin layer 50 of a nematic-smectic liquid crystal composition. As was pointed out hereinbefore, it is known in the art that smectic liquid crystals do not exhibit dynamic scattering such as is required when the liquid crystal is used in an electro-optical display cell as above described. It has been discovered in accordance with the present invention, however, that when the smectic liquid crystal is mixed with a nematic liquid crystal, the resulting composition does exhibit dynamic scattering when an electrical potential is impressed across the composition. Further, most of the smectic liquid crystal materials have a very low crystal-to-mesomorphic state transition temperature that is typically below room temperature. Thus, when such a smectic material is mixed with a nematic liquid crystal material, which typically has a very high crystalline-to-mesomorphic transition temperature, the resulting composition exists in the mesomorphic state at room temperatures.

For purposes of clarity, in the exploded view of FIG. 1 the thin layer 50 is shown separated from the substrates 10 and 12; however, in operation, the thin layer 50 is intimately in contact with the coating 14 and the electrodes, such as 16 – 28, formed on the surface of the substrate 12. A light source 52 is positioned behind substrate 12 to direct a light beam at an angle toward the rear face of substrate 12. Since both of the substrates 10 and 12 and the electrodes and coating thereon are optically transmissive, the light beam from source 52 normally passes through the display cell. The source of light 52 is electrically connected to a suitable electrical energy source 58 and may be any conventional source including an incandescent source. A non-reflective light absorbing plate 60, which is preferably a dull black in color, is positioned behind and spaced from the substrate 12.

Operation of the display device will be described with reference to FIG. 2 wherein there is a side view of the display device shown in FIG. 1. For clarity of description, only one electrode 20 of electrodes 16 – 28 is illustrated. The display device is shown enclosed by a suitable casing 70. As may be seen, the thin layer 50 of the nematic-smectic mesomorphic composition contacts the electrically conductive coating 14 and electrode 20. When switch 36 is closed, a voltage is impressed across the layer 50 between electrode 20 and that portion of coating 14 corresponding thereto. This voltage causes the portion of the layer 50 to which the voltage is impressed to diffuse light coming from light source 52. For purposes of illustration, light beam 72 is shown being diffused toward the eye 74 of an observer. A second representative light beam 76 passes through the portion of the nematic-smectic mesomorphic composition across which no voltage is impressed without being diffused. Thus, the observer is unable to see light from the light source in that portion of the layer. Plate 60 is provided to eliminate internal reflections from the light source 52 and also to eliminate stray room light which may interfere with the display characteristics of the display screen.

With reference again to FIG. 1, it may be seen that if switches 34 and 46 are energized, a voltage will be impressed across layer 50 in that portion of the layer corresponding to electrodes 16 and 28. An observer, such as observer 74 of FIG. 2, will see a numeral "1" displayed. Similarly, if all of the switches 34 – 46 are closed, the observer will see a numeral "8" displayed.

In FIG. 3 a different embodiment of the present invention is illustrated. In this embodiment, the optically transmissive substrate 10 and optically transmissive and electrically conductive coating 14 are constructed the same as above. A light source 80 connected to a suitable energy source 82 is positioned exterior to casing 70 to direct light beams 84 and 86 toward the nematic-smectic mesomorphic layer 50. In this embodiment, substrate 88 need not be optically transmissive. Contacting substrate 88 is a reflective coating 90 onto which an electrode, such as 20, is formed. Similar to the foregoing embodiment, the electrode 20 is electrically connected to switch 36 which is operable to impress an energy source 48 across electrode 20 and coating 14. In this embodiment, light from source 80, for example, light beam 86, strikes the nematic-smectic mesomorphic layer 50 in an area across which a voltage is impressed. The light is diffused by layer 50 and is reflected back toward the observer 92 by the reflective coating 90. Light beam 84, on the other hand, does not traverse a portion of the layer 50 across which an electrical field has been impressed and is therefore reflected by coating 90 away from the observer 92. Thus, as above, the observer 92 will see a display corresponding only to the size and shape of the electrode 20. Light source 80, in this embodiment, need not be an artificial source, as shown, but may be any available source including sunlight.

The electrical energy or impressed voltage across the layer 50 must be sufficiently large to reach or exceed a threshold voltage at which the nematic-smectic mesomorphic composition will scatter light. It has been found that for layers having a thickness of about 1 mil, the threshold voltage for most compositions occurs at around 7 volts while preferably a voltage on the order of 20 volts is utilized. For best results it has been found that the layers should be relatively thin, preferably less than 20 mils. The substrates 10 and 12 may be composed of any suitable material which is optically transmissive, for example, various types of glass, fused quartz, transparent varieties of corundum and transparent plastics or resins. The term optically transmissive as used herein includes both transparent and translucent materials. The coating and electrodes which are both electrically conductive and optically transmissive such as coating 14 and electrodes 16 – 28 may be composed of layers of indium oxide or tin oxide deposited on the surface of the respective substrates. If a reflective surface is desired, a thin layer of a metallic material such as silver or aluminum may be deposited on the substrate, such as coating 90 on substrate 88. It is to be understood, of course, with reference to FIG. 3, that the reflective coating 90 may be placed either at the front or rear of the substrate 88, but if placed on the front of substrate 88 as shown in FIG. 3, it must be electrically insulated from the electrode 20 to give the desired display effect. An alternate means of producing the desired reflection is to eliminate the coating 90 and compose the electrode 20 of a suitable reflective and conductive material.

Examples of specific nematic-smectic mesomorphic compositions which may be utilized in the present invention are set forth in TABLE I below. These compositions exhibit a wide transition temperature range and several of the compositions exist in the mesomorphic state at room temperature. Specific compositions were prepared by placing the appropriate weight of each component in a sealed vial. The vial was warmed until the materials were isotropic and was then placed in an ultrasonic bath at that temperature for 2 to 3 hours. The vial was allowed to cool slowly to room temperature in the ultrasonic bath.

TABLE I

| Ex. No. | *Composition | Weight Per-Cent | Crystal to Mesomorphic Temperature | Mesomorphic to Isotropic Temperature |
|---|---|---|---|---|
| 1 | 20% C | 80% | 72°C | 111°C |
| 2 | 40% C | 60% A | 71°C | 108°C |
| 3 | 60% C | 40% A | 58°C | 85°C |
| 4 | 80% C | 20% A | 28°C | 62°C |
| 5 | 20% C | 80% A | 58°C | 112°C |
| 6 | 40% B | 60% A | 55°C | 106°C |
| 7 | 60% B | 40% A | 59°C | 95°C |
| 8 | 80% B | 20% A | 35°C | 89°C |
| 9 | 90% B | 10% A | 30°C | 78°C |
| 10 | 60% B | 40% D | 67°C | 96°C |
| 11 | 80% B | 20% D | 43°C | 90°C |
| 12 | 90% B | 10% D | 22°C | 77°C |
| 13 | 10% D | 90% C | 19°C | 49°C |
| 14 | 20% D | 80% C | 22°C | 55°C |

*Examples of Materials Utilized:
A — 4,4'-bis(heptyloxy)azoxybenzene
B — p-ethoxybenzylidene-p-n-butylaniline
C — p-methoxybenzylidene-p-n-butylaniline
D — ethyl p-hexyloxybenzal-p-aminocinnamate As noted in the above table, a composition including by weight 90 percent p-ethoxybenzylidene-p-n-butylaniline and 10 percent ethyl p-hexyloxybenzal-p-aminocinnamate (example 12) exists in the mesomorphic state at room temperature. This composition was tested in a 1 mil electro-optical display cell at 25°C and exhibited dynamic scattering when a potential of about 22 volts was applied across the cell. Further, when the above compositions are doped with about 1–10 percent by weight of a cholesteric liquid crystal such as cholesterol nonanoate, the compositions exhibit memory, and may be erased with an alternating current signal of about 7KH$_z$.

Although examples have been given showing specific nematic-smectic compositions, it is to be understood that other nematic-smectic compositions may be used within the scope of the present invention. In other words, a novel feature of the invention is producing a mixture of smectic and nematic liquid crystals to achieve a composition having a broad temperature range. It is to be appreciated that by varying the specific nematic and smectic materials and the ratio of each, the upper and lower limits of the temperature range at which the composition is in the mesomorphic state may be controlled.

What is claimed is:

1. In an electro-optical display device including a first optically transmissive substrate having an optically transmissive and electrically conducting coating on a face thereof, a second substrate having an electrically conductive coating on a face thereof, said substrate being positioned such that the coatings are adjacent and substantially equidistantly spaced, a light source means positioned to direct light toward the substrates, and means for impressing a voltage between selected portions of said coatings, the improvement comprising a nematic-smectic liquid crystal composition occupying the space between said coatings, said composition exhibiting dynamic scattering responsive to a voltage on the order of about 20 volts or less.

2. The display device of claim 1 wherein about 1 to 10 percent by weight of cholesteric liquid crystal is added to said composition.

3. The display device of claim 1 wherein said second substrate is optically transmissive.

4. The display device of claim 1 wherein said second substrate is capable of reflecting light.

5. The display device of claim 4 wherein the second substrate has an optically reflective layer thereon.

6. A method for displaying light from a light source comprising the steps of:
   a. directing a light beam at an angle toward a thin layer of a nematic-smectic liquid crystal composition which exhibits dynamic scattering responsive to an applied voltage, and
   b. impressing a voltage on the order of about 20 volts or less across said layer sufficient to cause said composition to scatter light.

7. A liquid crystal composition consisting essentially of a mixture of a smectic liquid crystal material and a nematic liquid crystal material, said mixture exhibiting dynamic scattering over a broad temperature range responsive to an applied voltage thereacross on the order of about 20 volts or less.

8. In an electro-optical display device including a first optically transmissive substrate having an optically transmissive and electrically conducting coating on a face thereof, a second substrate having an electrically conductive coating on a face thereof, said substrate being positioned such that the coatings are adjacent and substantially equidistantly spaced, a light source means positioned to direct light toward the substrates, and means for impressing a voltage between selected portions of said coatings, the improvement comprising a nematic-smectic liquid crystal composition occupying the space between said coatings, said composition consisting essentially of from about 20 to 80 weight percentage of p-methoxybenzylidene-p-n-butylaniline and from about 20 to 80 weight percentage of 4,4'-bis(heptyloxy)azoxybenzene, and having a threshold electrical field which when exceeded causes the composition to scatter light.

9. In an electro-optical display device including a first optically transmissive substrate having an optically transmissive and electrically conducting coating on a face thereof, a second substrate having an electrically conductive coating on a face thereof, said substrate being positioned such that the coatings are adjacent and substantially equidistantly spaced, a light source means positioned to direct light toward the substrates, and means for impressing a voltage between selected portions of said coatings, the improvement comprising a nematic-smectic liquid crystal composition occupying the space between said coatings, said composition consisting essentially of from about 20 to 90 weight percentage of p-ethoxybenzylidene-p-n-butylaniline and from about 10 to 80 weight percentage of 4,4'-bis(heptyloxy)azoxybenzene, and having a threshold electrical field which when exceeded causes the composition to scatter light.

10. In an electro-optical display device including a first optically transmissive substrate having an optically transmissive and electrically conducting coating on a face thereof, a second substrate having an electrically conductive coating on a face thereof, said substrate being positioned such that the coatings are adjacent and substantially equidistantly spaced, a light source means positioned to direct light toward the substrates, and means for impressing a voltage between selected portions of said coatings, the improvement comprising a nematic-smectic liquid crystal composition occupying the space between said coatings, said composition consisting essentially of from about 60 to 90 weight percentage of p-ethoxybenzylidene-p-n-butylaniline and from about 10 to 40 weight percentage of ethyl p-hexyloxybenzal-p-aminocinnamate, and having a threshold electrical field which when exceeded causes the composition to scatter light.

11. In an electro-optical display device including a first optically transmissive substrate having an optically transmissive and electrically conducting coating on a face thereof, a second substrate having an electrically conductive coating on a face thereof, said substrate being positioned such that the coatings are adjacent and substantially equidistantly spaced, a light source means positioned to direct light toward the substrates, and means for impressing a voltage between selected portions of said coatings, the improvement comprising a nematic-smectic liquid crystal composition occupying the space between said coatings, said composition consisting essentially of from about 10 to 20 weight percentage of ethyl p-hexyloxybenzal-p-aminocinnamate and from about 80 to 90 weight percentage of p-methoxybenzylidene-p-n-butylaniline, and having a threshold electrical field which when exceeded causes the composition to scatter light.

12. A method for displaying light from a light source comprising the steps of:
 a. directing a light beam at an angle toward a thin layer of a nematic-smectic liquid crystal composition wherein said nematic liquid crystal material is selected from the group consisting of 4,4'-bis(heptyloxy)azoxybenzene and ethyl p-hexyloxybenzal-p-aminocinnamate and said smectic liquid crystal material is selected from the group consisting of p-ethoxybenzylidene-p-n-butylaniline and p-methoxybenzylidene-p-n-butylaniline, and
 b. impressing a voltage across said layer sufficient to cause said composition to scatter light.

* * * * *